(12) United States Patent
Miller et al.

(10) Patent No.: US 6,879,342 B1
(45) Date of Patent: Apr. 12, 2005

(54) ELECTRONIC CAMERA WITH IMAGE REVIEW

(75) Inventors: Michael Eugene Miller, Rochester, NY (US); Richard William Lourette, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 973 days.

(21) Appl. No.: 09/598,125

(22) Filed: Jun. 21, 2000

Related U.S. Application Data

(62) Division of application No. 08/769,573, filed on Dec. 19, 1996.

(51) Int. Cl.[7] ............................................... H04N 5/222
(52) U.S. Cl. ........................... 348/333.05; 348/333.02; 348/333.11; 348/231.99
(58) Field of Search ....................... 348/333.01, 333.02, 348/333.05, 333.11, 220.1, 239, 231.1, 231.99, 231.3

(56) References Cited

U.S. PATENT DOCUMENTS

| | | | | |
|---|---|---|---|---|
| 5,157,511 A | * | 10/1992 | Kawai et al. ................. | 386/68 |
| 5,742,339 A | * | 4/1998 | Wakui ...................... | 348/231.9 |
| 5,861,918 A | * | 1/1999 | Anderson et al. ......... | 348/231.9 |
| 6,097,431 A | * | 8/2000 | Anderson et al. ......... | 348/231.7 |
| 6,249,316 B1 | * | 6/2001 | Anderson .............. | 348/333.05 |

* cited by examiner

Primary Examiner—Andrew Christensen
Assistant Examiner—Jacqueline Wilson
(74) Attorney, Agent, or Firm—Pamela R. Crocker

(57) ABSTRACT

A camera comprising:
(a) means for capturing an image of a real world scene as an image signal;
(b) storage means for storing captured images and from which stored images can be read;
(c) a screen;
(d) a means for displaying on the screen a symbolic representation of the list of stored images and a user selected location within the list;
(e) a user interface which allows a user to select the location within the list; and
(f) means for displaying on the screen the image within the list corresponding to the selected location.

A method which can be executed by a camera such as the above, is also provided.

21 Claims, 7 Drawing Sheets

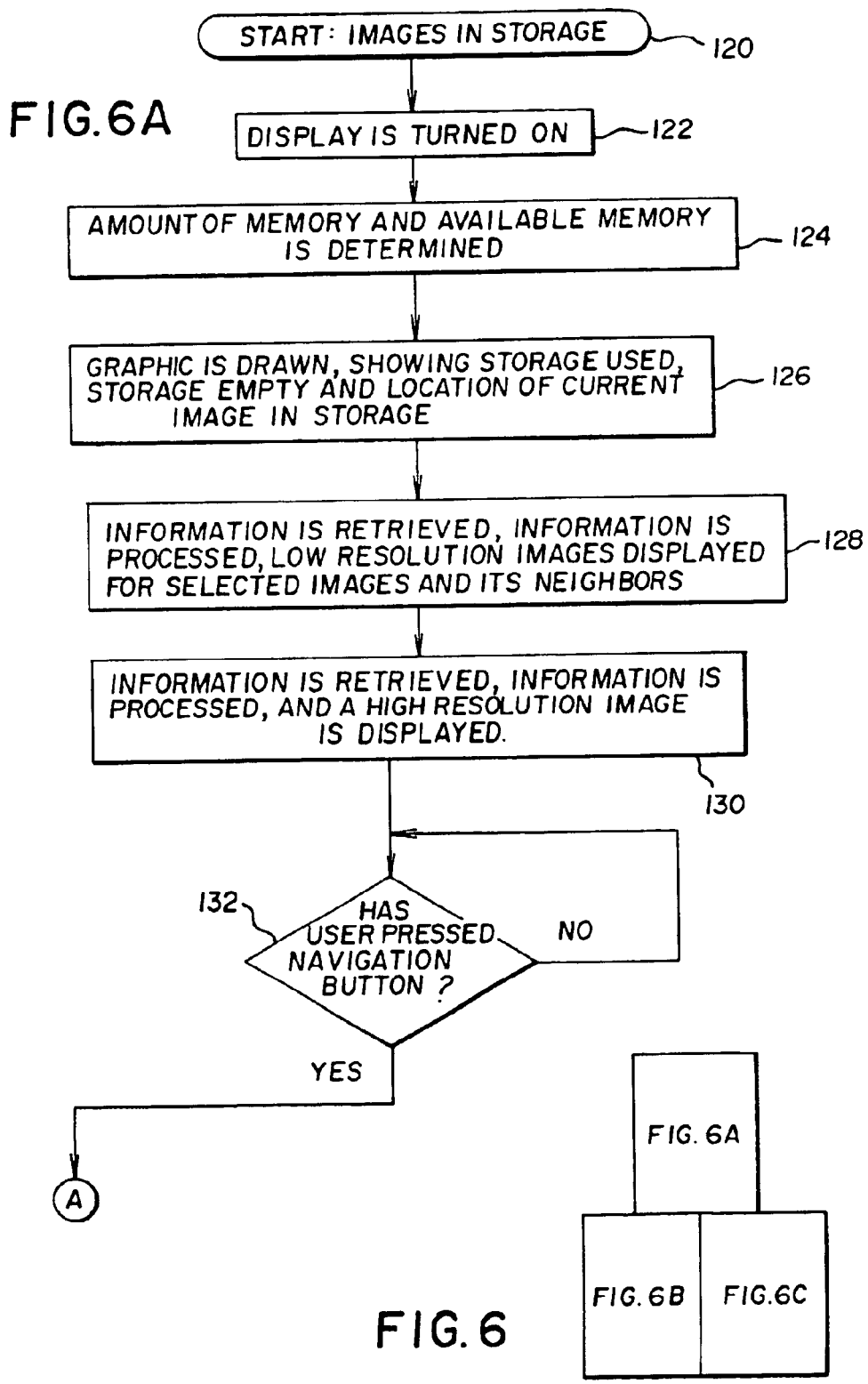

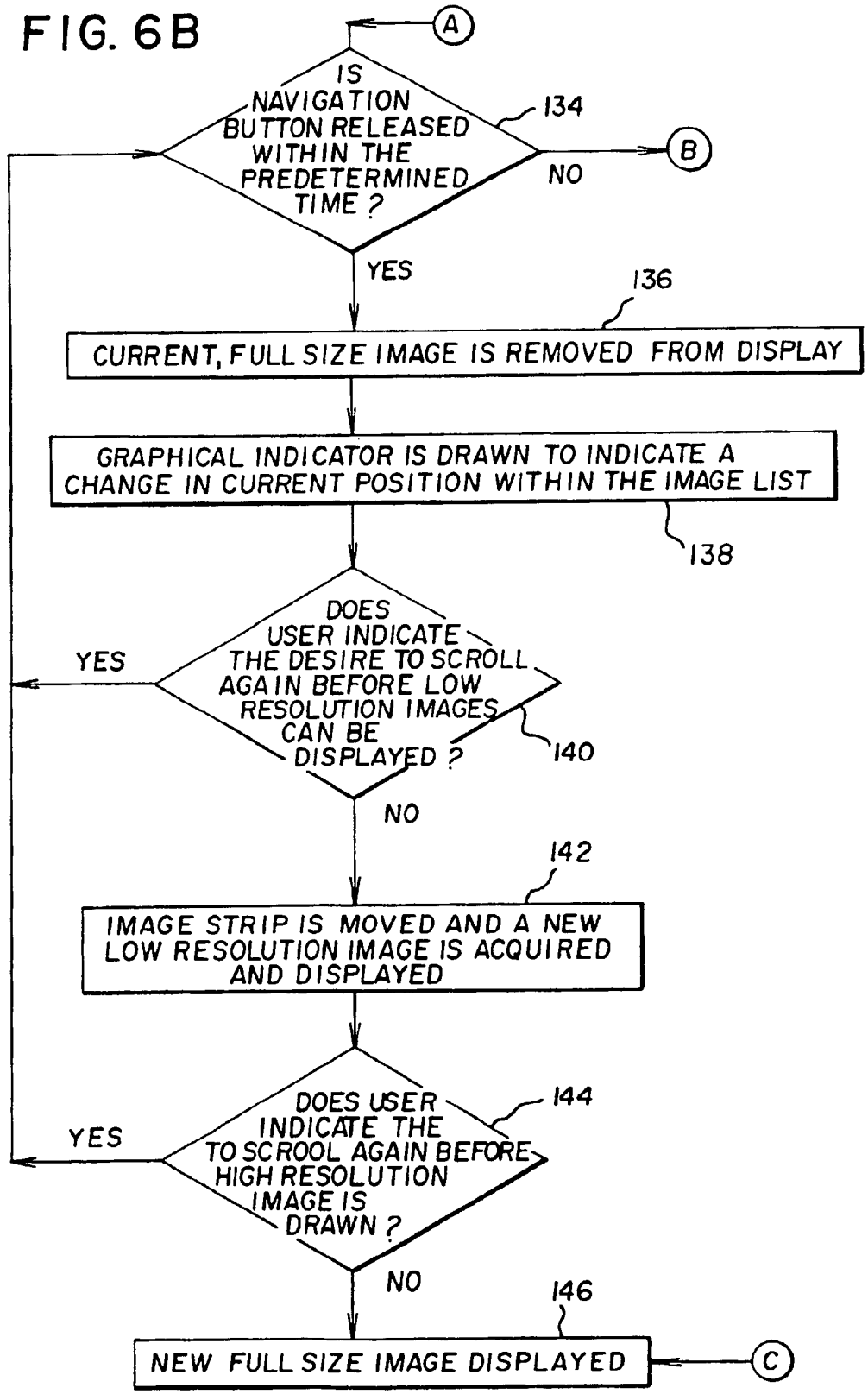

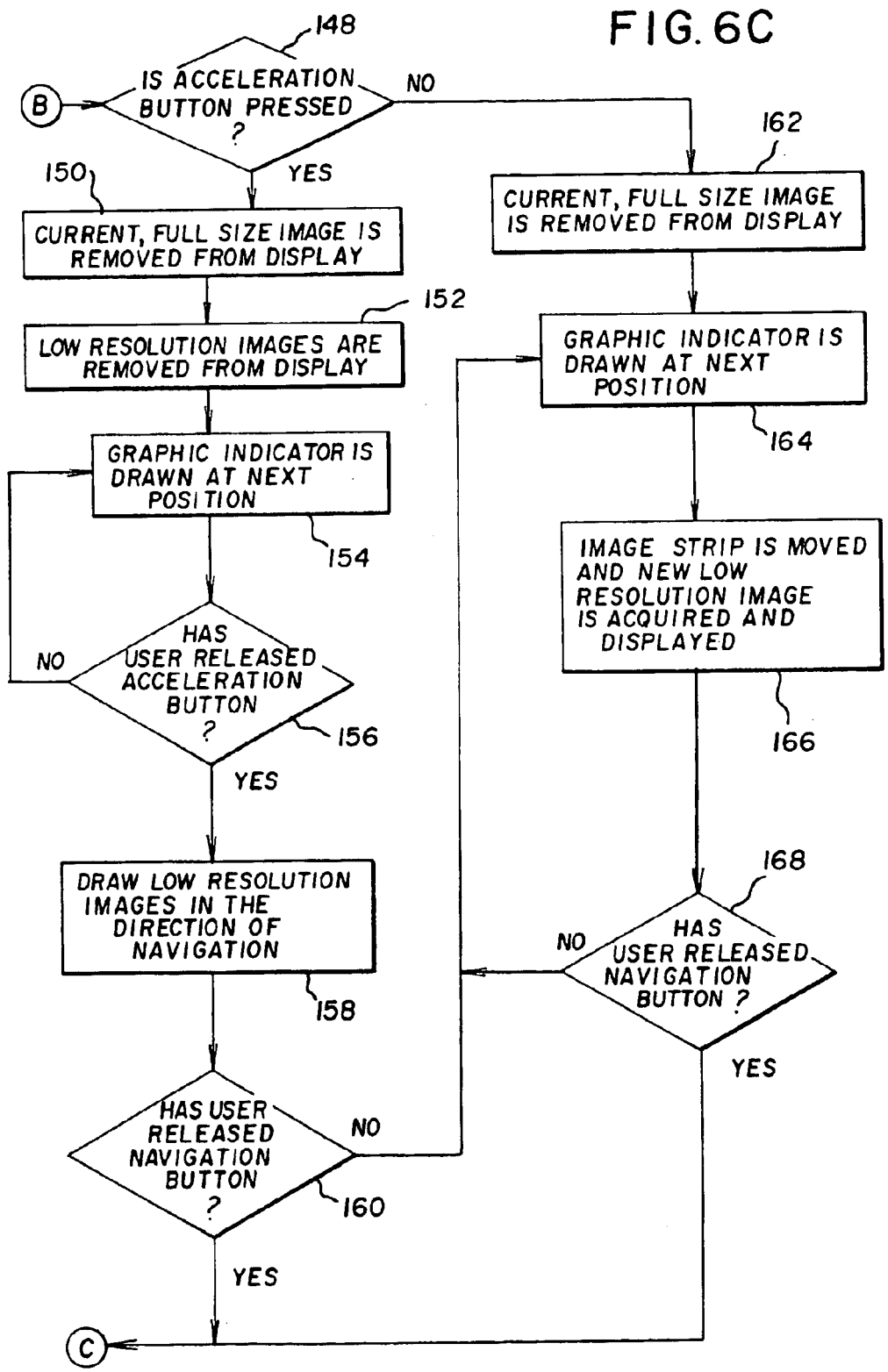

ELECTRONIC CAMERA WITH IMAGE REVIEW

CROSS REFERENCE TO RELATED APPLICATIONS

This is a divisional application of Ser. No. 08/769,573, filed Dec. 19, 1996.

FIELD OF THE INVENTION

The invention relates generally to the field of photography, and in particular to electronic cameras.

BACKGROUND OF THE INVENTION

Traditional silver halide cameras typically display the number of the current frame to be exposed to the user. The user must use this information in conjunction with the number of frames available in the film canister to calculate the number of frames that remain to be exposed. All of this information is never provided to the user in a concise fashion and the number has to be read and understood. Recently introduced Advanced Photographic System ("APS") cameras will provide some assistance in this area by providing a number that corresponds to the number of frames remaining to be exposed. However, the user, will have no method for determining the number of frames that he or she has previously exposed. Software has receently become available which allows scrolling through images on a computer platform. For example, the recently available PICTURE DISK software from Eastman Kodak, which is provided to a customer on a diskette along with scanned images from a roll of film, presents a screen in a Microsoft Windows environment with thumbnails of the images, and a vertical scroll bar on the Windows screen which allows a user to scroll through the thumbnails.

The above problem is exacerbated in cameras that provide an electronic review feature. Such cameras typically have a storage medium on which to store captured images as image signals, and a screen on which any previously captured stored images can be reviewed. In such cameras it is desirable not only to indicate to the user the number of frames exposed and the number of frames remaining to be exposed, but also to indicate which frame is currently being viewed on the electronic display. The Casio QV-10 digital camera assists somewhat with this latter problem by numbering the image frames as they are taken and displaying this number over the image during image review. While this tells the user which frame is currently being viewed, the user has no direct way of determining the number of frames left to be exposed and only knows how many frames have been exposed by scrolling to the last image in the image list and reading the number of this image.

In addition, in an electronic digital camera such as the Casio QV-10, it is necessary for a user to review the stored images one by one to reach a particular one to be reviewed. For example, if the user is viewing image 1 and wishes to view image 20, he or she must press a button to advance to the next image at which time image 2 is generated and brought to the screen after about a 2 second delay required for the camera electronics to read and display the stored image. The user must again press the advance button at which time image 3 is generated and brought to the screen after another 2 second delay. This process must be repeated 19 times by the user who wishes to view image 20. This process requires better than 0.5 minute to complete. Such a method of scrolling through the images is therefore relatively time consuming and tedious.

It would be desirable then, to have an electronic camera which stores captured images and which allows a user to relatively rapidly review any desired stored image, and to do so without repetitive actions. It would further be desirable that the user can also readily ascertain the number of images stored and further also the space remaining for storage of further captured images.

SUMMARY OF THE INVENTION

The present invention, then, provides a camera comprising:

(a) means for capturing an image of a real world scene as an image signal;

(b) storage means for storing captured images and from which stored images can be read;

(c) a screen;

(d) a means for displaying on the screen a symbolic representation of the list of stored images and a user selected location within the list;

(e) a user interface which allows a user to select the location within the list; and (f) means for displaying on the screen the image within the list corresponding to the selected location.

The present invention further provides a method for capturing, storing and displaying stored images, on a camera, comprising:

(a) capturing on the camera, images of real world scenes as image signals;

(b) storing the captured images in the camera;

(c) displaying on a screen on the camera, a symbolic representation of the list of stored images and a user selected location within the list; and (d) displaying on the screen the image within the list corresponding to the selected location.

The present invention provides a simple means of allowing, in an electronic camera, a user to relatively quickly review any desired stored image, and to do so without repetitive actions. Additionally, the user can also readily ascertain the number of images stored and further also the space remaining for storage of further captured images (i.e. the number of exposures that remain to be taken).

BRIEF DESCRIPTION OF THE DRAWINGS

Embodiments of the invention will now be described with reference to the drawings, in which:

FIG. 6 is a flowchart illustrating elements of the method of the present invention as executed on the camera of FIG. 5.

To facilitate understanding, identical reference numerals have been used, where possible, to designate identical elements that are common to the figures.

DETAILED DESCRIPTION OF THE INVENTION

In the present invention, the symbolic representation displayed may, for example, be alphanumeric characters such as a list of numbers identifying each stored image as well as unexposed image frames. For example, the list of numbers may represent images numbered 1 to 24, which numbers are of different appearances (such as different color, texture, or font) depending on whether the image frame is exposed or not. Another example of a symbolic representation is a graphical representation, such as a bar along which a pointer is moved, or a rectangle divided into smaller regions each representing a captured image. In any event, the user interface may conveniently allow a user to scroll through the symbolic representation (such as pressing a button which moves the pointer on the bar) to the user selected location. However, the symbolic representation displays within the confines of the camera screen, a representation of all the stored images (that is, exposed image frames) and preferably also all the space remaining on which images can be stored (that is, unexposed image frames). To prevent an undue amount of time being required to generate the symbolic representation, it does not display the images themselves (either in the stored resolution or a lower resolution in which image features are visually identifiable).

Figure 1:
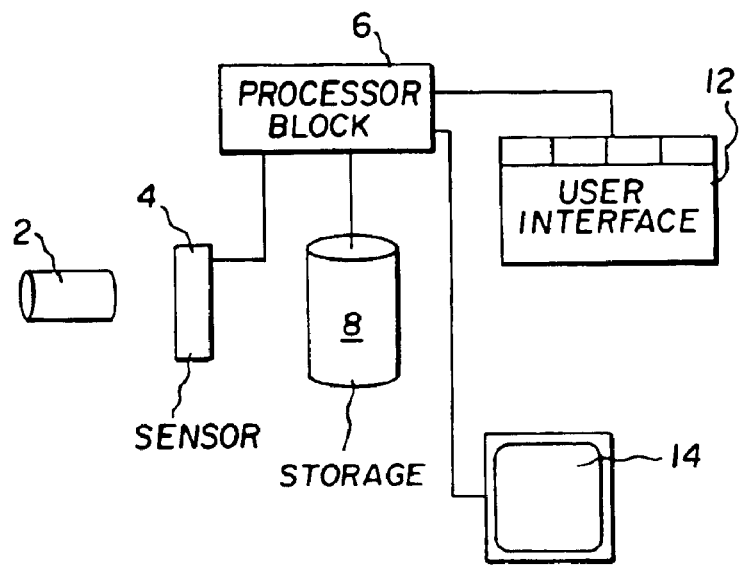
FIG. 1 is a schematic diagram of a camera of the present invention.

Turning first to the schematic of FIG. 1, the camera shown includes a lens 2 which directs light from real world scene onto a sensor 4. Typically the light passes through known shutter and aperture mechanisms (not shown), before falling on sensor 4. The shutter would be activated by a push button or similar user control. Sensor 4 is most typically a single array Charge Coupled Device ("CCD") sensor covered by a color filter array ("CFA"), or could be three CCD sensors with appropriate filters/mirrors (not shown) being provided to direct red, green, and blue light onto respective sensors. All of the camera elements in FIG. 1 will typically be mounted on/in a single housing (such as housing 20 of FIGS. 2 and 3). A battery compartment (not shown) is typically provided to receive one or more batteries for power. All of these are conventional elements in electronic cameras. The camera is preferably portable, weighing no more than about 5 kg and preferably less than 2 kg (or even 1 kg), without batteries.

Processor block 6 includes appropriate circuitry including analog to digital converters, to convert the signal from sensor 4 to a digital signal for storage in storage device 8, in a known manner. Storage device 8 can be any suitable digital signal storage device, including optical, magnetic (such as a disk drive) or solid state memory devices. The actual memory media used in storage device 8 is preferably removable but need not be. Captured images of real world scenes in the form of corresponding digital image signals, can therefore be stored in storage device 8 in a list ordered in the sequence in which the images were stored, and retrieved therefrom by processor block 6 for display on user viewing screen 14. Screen 14 may be any suitable compact, low power consuming display, preferably a liquid crystal display ("LCD"). Features of the camera are controlled by a user through user interface 12. Processor block 6 may further include a processor and other further necessary hardware and/or software for any apparatus or method of the present invention. Processor block 6 then, may act as the symbolic displaying means and image displaying means of the present invention.

Figure 2:
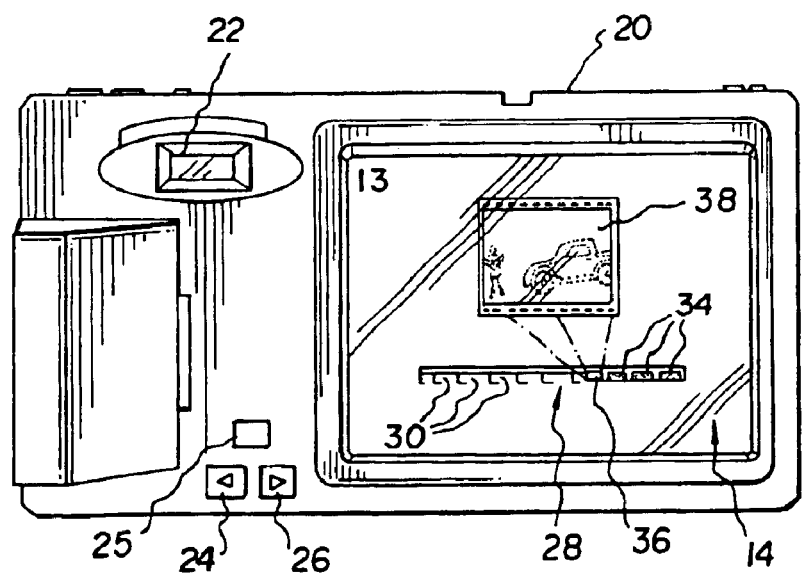
FIG. 2 is a back view of a camera of the present invention illustrating a particular output of the symbolic representation displaying means and image displaying means.
Figure 3:
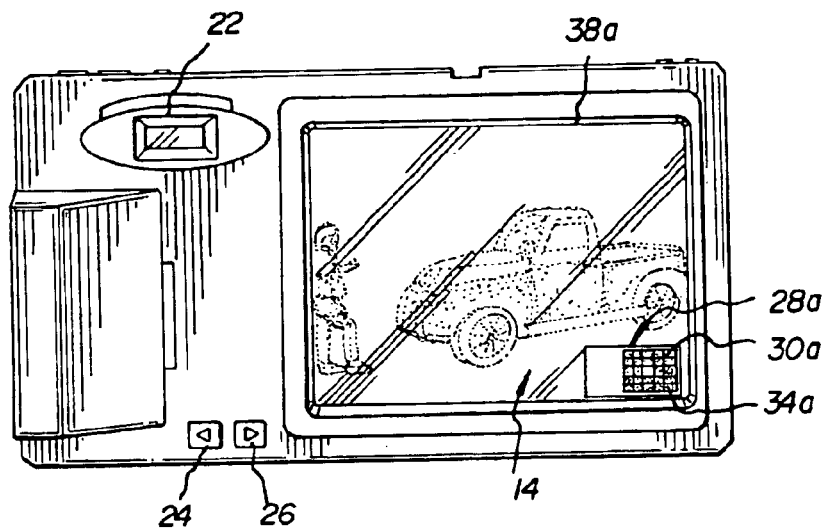
FIG. 3 is a view similar to FIG. 2 but with an alternative output of the symbolic representation displaying means and image displaying means.

As described above, a camera of the present invention includes a symbolic representation of the list of image frames (whether exposed or not) within the camera, and a user selected location within the list of images. Additionally, a small or low resolution representation of the image at the user selected location within the list may also be provided. The fact that only a small or low resolution image may be displayed, reduces time to retrieve the stored image at the user selected location, and allows faster movement through the list by a user. Turning particularly to FIGS. 1 and 2, the back of the camera carries on housing 20, and LCD screen, a viewfinder 22, and user interface controls in the form of reverse and forward buttons 24, 26 respectively. As captured images of real world scenes are stored in storage device 8 of the camera, a list of images are generated. The size of this list is limited by the storage capacity of storage device 8, and is known. Therefore, the storage capacity of the camera can be represented as a list of sequenced slots into which images can be placed (that is, exposed or unexposed image frames). This graphical representation of the image frame list can be generated by processor block 6. FIGS. 1 and 2 illustrate different forms of such a graphical representation. This is depicted as a film strip 28 in FIG. 1 and as an index print 28a in FIG. 2. The single graphical representation 28 or 28a displays the list of captured images as small gray rectangles 30. The unexposed image frames (space remaining in storage device 8) are displayed as black rectangles 34 (FIG. 2) or 34a (FIG. 3). The user selected location is indicated by white rectangle 36 (FIG. 2) or rectangel 36a (FIG. 3), which will typically be positioned by a user on one of the exposed image frame rectangles 30 or 30a (which will turn white when selected). Of course, the foregoing regions of different appearance could be obtained, for example, by using other different colors than the gray, black white combination, or by using different textures or regions of other different appearance (such as different numbers representing each image frame), or any combination of the foregoing. Additionally, the user selected location may also be indicated by display of a frame number such as frame number "13" in shown in the upper left hand corner of screen 14 in FIG. 2, and the lower left hand corner of screen 14 in FIG. 3.

Processor block 6 also causes the image corresponding to the user selected location 36 within the graphical list representation 28 or index 28a (particularly, image frame "13" in FIGS. 1 and 2), to be displayed on screen 14. The displayed image 38 is preferably in the form of a smaller or lower resolution form of the larger, higher resolution image that is stored in the storage device 8. This smaller or lower resolution image provides the user an indication of the image that is stored within the currently selected slot in the image list. In the case of FIG. 2, this image is displayed as a reduced size image, while in FIG. 3 it is displayed as a larger size the same size as which the image will later be displayed, but at a lower resolution.

It is important to note that before the images can be displayed, they have to be retrieved from the memory of the camera and processed to provide a pleasing image. Completing this process for the entire image can require a significant amount of processing. The speed at which this process is completed will be dictated by the complexity of the process and by the power of the processing path in the camera. However, it is possible to use a number of techniques to obtain only a small segment of the entire image and to process this small segment much more rapidly than the entire image can be processed, thus allowing a smaller or lower resolution version of the image to be processed and displayed much more quickly than the entire image can be processed and displayed. Therefore, displaying a small or low resolution representation of the image during scrolling can increase the perceived speed of scrolling.

Other additional features can be provided by processor block 6 so that the speed at which a user can scroll through a graphical list representation, such as representations 28 or 28a is further enhanced. For example, processor block 6 may, during scrolling, not display images corresponding to positions on the graphical representation 28 or 28a intermediate beginning and end scrolling positions. This can be accomplished simply by processor block 6 waiting a predetermined time (normally factory preset) after button 24 or 26 is pushed to see if it is pushed again (or is still being pushed), before retrieving a small or low resolution form of an image (such as image 38 or 38a) corresponding to the new user selected location. Alternatively, processor block 6 may start retrieving a form of the image corresponding to the new user selected location but terminate retrieval if during the time required for retrieval, the user selects another location.

As stated earlier, besides the advantage of providing the user with information as to how many images have been exposed, how many images remain to be exposed, and which image is currently being viewed, the camera described herein allows the user to scroll through images in a way that is perceived to be faster than simply scrolling through each of the full resolution images one at a time. The preferred method for scrolling through images using this camera is depicted in the flow chart in FIG. 4 and described below.

Figure 4:
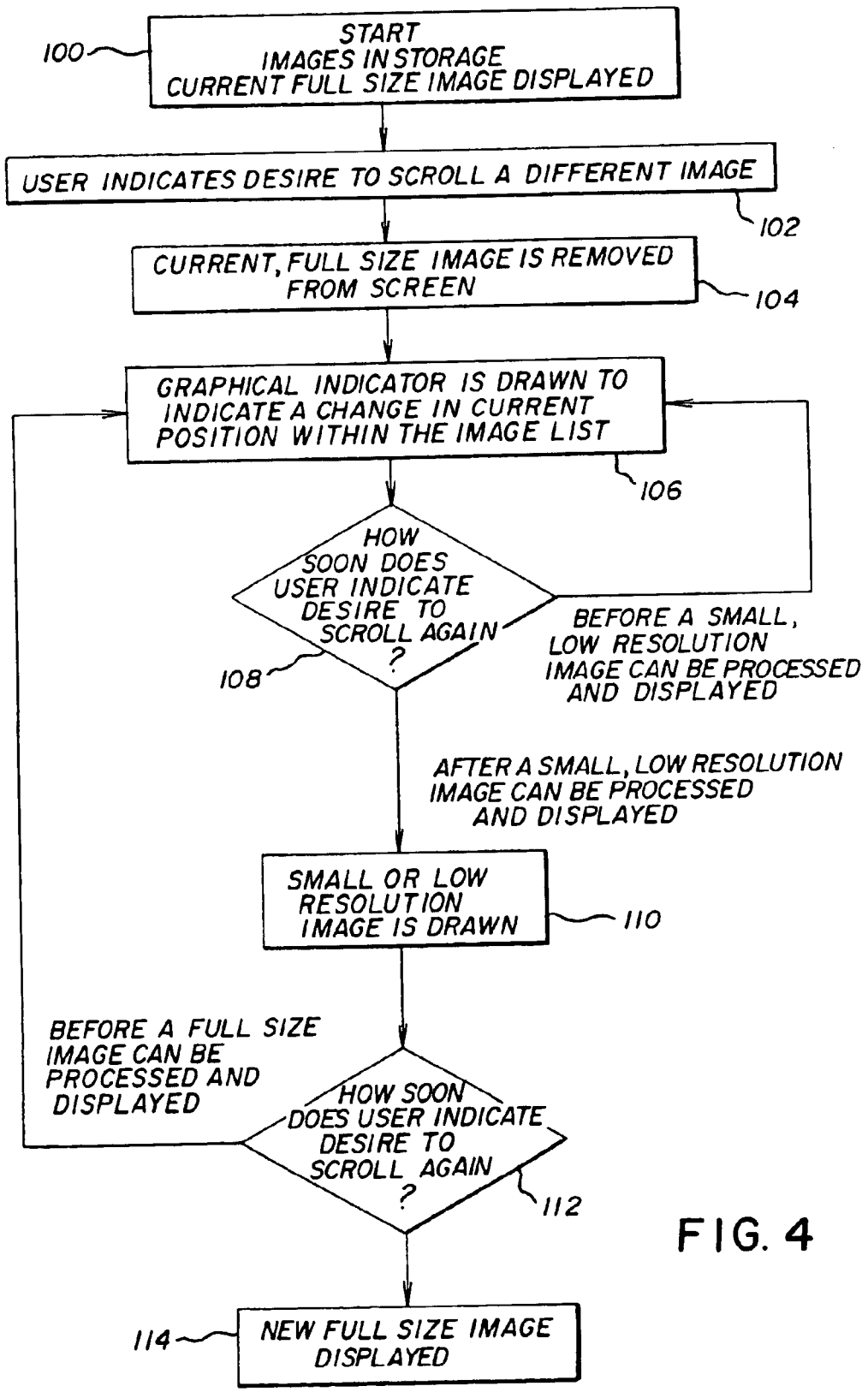
FIG. 4 is a flowchart illustrating elements of the method of the present invention as executed on the camera of FIG. 2 or 3.

Referring particularly to FIG. 4, as indicated therein, it will be assumed that a user has previously captured a number of images. The full size, full resolution stored image at the user selected location in the graphical representation 28 or 28a is displayed (100) on screen 14 by processor block 6. When the user indicates (102), by pushing reverse or forward buttons 24, 26, that he or she wants to scroll to an image that corresponds to another location in the graphical representation, the image is instantly removed (104) from screen 14 and the graphical representation of the image list is drawn (106) to indicate the position of the new image in the image list. For example, looking at FIG. 2 if the user indicated that they wanted to scroll from the thirteenth to the twelfth image, the film strip 28 would be drawn with the twelfth image highlighted in white and the thirteenth image would be shown as gray. The number indicating the current image (the number 13 in FIG. 1) would then be updated to indicate the change (e.g., the 13 would be changed to the number 12). The camera would then begin retrieving a small or low resolution representation of the image to display it on the camera.

At this point in time, processor block 6 continues to monitor (108) how soon the user indicates that he wishes to scroll to a new location. If the user indicated that they wanted to move to a different image in the image list, before the camera could retrieve and display the small or low resolution representation of the image, the camera would simply redraw the graphic and number to indicate this change, and the camera would begin processing a small or low resolution representation of this new image (that is, return to step 106 in FIG. 4). However, if the user waited beyond the predetermined time for the camera to complete the processing of the small or low resolution image, this image would be displayed (110) and the camera would begin to process (112) the full size, full resolution version of this image for display. Once again, the user can indicate that they want to move to a different image in the image list, at which time the image is removed and the graphic is redrawn. However, if the user does not indicate that he or she wishes to move to a different image in the image list, the full size, full resolution image replaces (114) the graphic and small image after it has been processed by the camera.

The progressive display of information to the user as described provides the user the opportunity to decide to continue to scroll before enough time has passed to allow the reduced resolution or full size image to be processed. By providing this capability, the user will be able to scroll to the image they desire to review more quickly than they would if they were forced to wait for the entire image to be processed.

Figure 5:
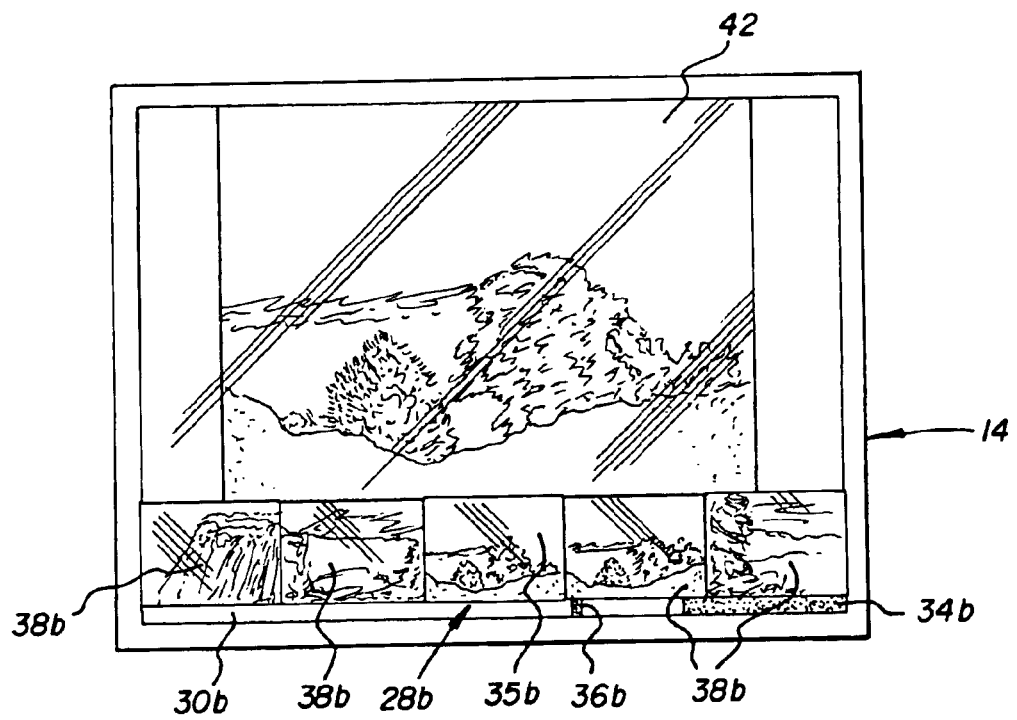
FIG. 5 is a view of the screen of a camera of the present invention, showing a further alternative output of the symbolic representation displaying means and image displaying means.

A particularly preferred implementation of the present invention is further illustrated in FIG. 5. In particular, in the embodiment of FIG. 5 processor block 6 causes to be displayed on screen 14, a single graphic representation in the form of bar 28b showing the complete image frame list. The exposed image frames on bar 28b are represented by continuous light gray portion 30b of bar 28b, while unexposed image frames are represented by darker gray portion 34b of bar 28b. A sliding indicator 36b represents the user selected position within bar 28b. Portions 30b and 34b of bar 28b, and cursor 36b, while shown as different shades of gray in FIG. 5, can all be of different colors, shadings or have other different features which makes them visually distinctive from one another. Processor block 6 can vary the position of indicator 36b under control of user operated reverse and forward buttons 24, 26 respectively shown in FIG. 2.

When indicator 36b is at rest (that is, the user has not pressed reverse or forward buttons 24, 26 for some time), processor block 6 also displays on screen 14 a lower resolution version 35b of the stored full size and full resolution exposed image corresponding to the location of indicator 36b within bar 28b. Additionally, processor block 6 further displays lower resolution versions 38b of each of the two full size and full resolution images corresponding to positions on either side of indicator 36b on bar 28b. A larger resolution version, 42 of the selected image is also displayed. Version 42 may be the full resolution image stored in storage 8, or may be a resolution intermediate the full stored resolution and the resolution of version 35b.

The user can then navigate backwards and forwards through the list of images in storage device by simply pressing a forward button 24 or reverse button 26. The user will be able to scroll along through the list of images and then loop to the beginning of this list after passing through a screen that indicates beginning/ending of the strip. Graphical overlays will displayed on the screen to indicate the format of the type or format of the image being viewed.

If the user simply presses and releases forward or reverse buttons 24, 26, the next large image is displayed, the low resolution images move one image in the direction opposite to the direction indicated by the navigation button, and the position indicator moves to the right by a distance proportional to the amount of total memory used by the image. An acceleration button 25 can also be provided on the camera if a user wishes to increase the speed of scrolling beyond the speed provided when forward or reverse buttons 24, 26 are pressed. The acceleration button 25 would be pressed after the forward or reverse buttons 24, 26 are pressed.

The operation of the method of the present invention in which the display illustrated in FIG. 5 is generated, is depicted in the flowchart in FIG. 6 and described below. It is assumed that there are previously captured images from sensor 4, already stored in storage device 8.

The start-up sequence when the screen 14 is first turned on, is illustrated in steps 120–130. The amount of total memory and available memory is first determined (124), and the graphic representation 28b is drawn (126). The necessary information is retrieved (128) from storage device 8 to cause the lower resolution images 35b and 38b to be displayed on screen 14. Additionally, the higher resolution image 42 is also displayed (130).

When the user presses reverse or forward buttons 24, 26 (132) and the button is released within a predetermined time (134), the current full size image is removed from the display (136), the graphical indicator is drawn to indicate a change in the current position within the image list (138), the image strip is moved in the direction opposite the direction of the reverse or forward buttons and the low resolution image is then acquired and displayed (142). The full size image is then acquired and displayed (146). If the user presses the reverse or forward buttons 24, 26 before the low resolution image is displayed (140) or before the new full size image is displayed (144), the camera's current activity is interrupted and it behaves as if the reverse of forward button was just pressed (134).

If the user presses and holds the reverse or forward buttons for longer than a predetermined time, and the user has not pressed the acceleration button 25 (148) the camera removes the current full size image from the display (162), draws the graphic indicator at its next position (164), moves the image strip and displays the new low resolution image (166). The camera then repeats the steps 164 and 166 until the user releases the reverse or forward button. When the user releases the reverse or forward button, the new full size image that is represented by the center low resolution image is displayed (146).

If the user presses and holds the reverse or forward button and then presses and holds the acceleration button 25 (148), the full size image is removed from the display and steps 150 through 160 are completed. These steps are the same as described in steps 162 to 168 except the images in the image strip are not drawn until the user releases the acceleration button 25 (156).

Figure 7:
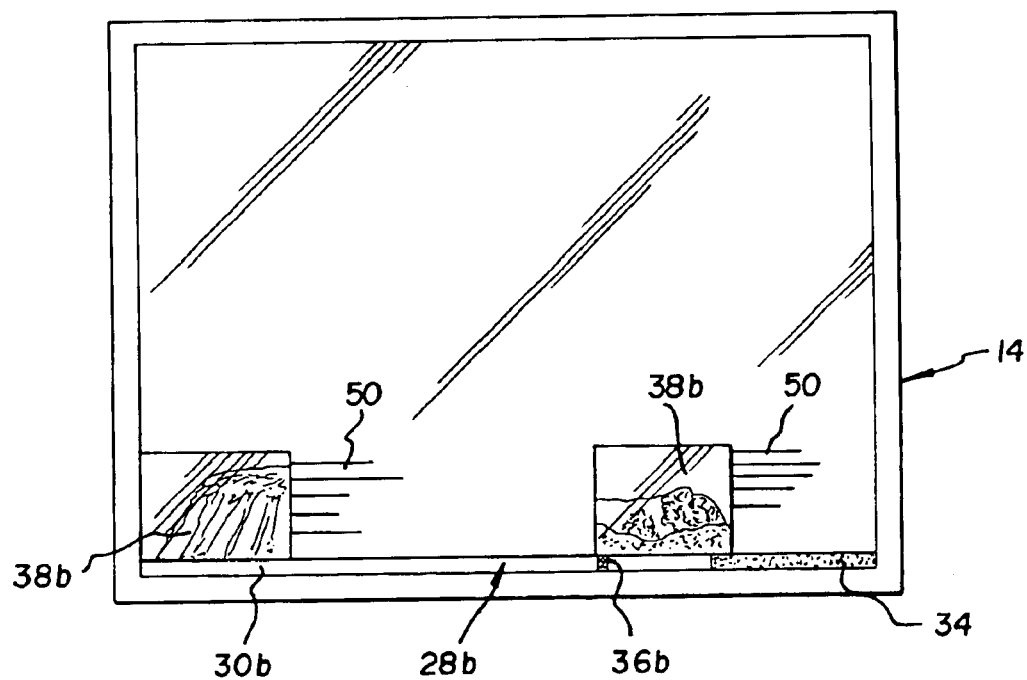
FIG. 7 is a view of the screen of a camera of the present invention, showing an output of an alternative image displaying means.

It may be that a user will desire to scroll through the image list represented by bar 28b at a rate which exceeds the ability of storage 8 and processor block 6 to retrieve and display the low resolution versions of all of images represented by the space on bar 28b over which sliding indicator 36b is moved. For example, this might be the case when the acceleration button is pressed. However, the user may still want to see at least some low resolution versions of the images. In this case, processor block 6 will acquire and display only interspersed ones of the low resolution images 38b in a manner as shown in FIG. 7. For example, only every second, third, or fourth image might be retrieved and displayed on screen 14 (that is, the displayed images are separated in the image list by one, two, or three images). In addition, some visual indication can be provided on screen 14 to show the user that they are engaged in a rapid scrolling and that only interspersed low resolution images are being retrieved. For example, as low resolution images 38b are moved to the left in FIG. 7, trailing lines 50 can be displayed to suggest rapid scrolling through the images. Other visual indications could be attached or displayed with the low resolution images 38b which indicates a faster or different rate or mode of review.

It will be appreciated that forward and reverse buttons 24, 26 may generate other than discrete signals when pressed. For example, those buttons may generate signals which vary with the degree of pressure applied by a user.

Such signals may then be used by processor block 6 to vary the rate at which new low resolution images are acquired and displayed on screen 14, such that the rate of acquisition and display is a function of pressure applied by the user. Thus, when a user presses forward or reverse buttons 24, 26 harder, the rate of acquisition and display of the low resolution images is increased. If the desired rate of acquisition and retrieval, as indicated by the user's pressure on one of the buttons 24 or 26, exceeds the rate at which storage 8 and processor block 6 allows for retrieval, then processor 6 may then cause only interspersed to be acquired and displayed such as in the manner described in connection with FIG. 7 (for example, only every second, third, or fourth image, may be displayed as pressure on buttons 24 or 26 is increased).

The present invention can also advantageously be applied to display devices for reviewing images electronically stored on a media. This is particularly true of other portable display devices which, like the camera described above, will often have limited processing power and storage space. Such portable devices will generally weigh less than about 5 kg and preferably less than about 2 kg (and even less than 1 kg), without batteries. In such a device, the image capturing means (particularly, lens 2, sensor 4, and the hardware and/or software components of processor block 6 which convert the signal from sensor 4 to a digital electrical signal) can be eliminated and the storage means can be replaced by a media reader for reading images stored on the media. The other features of such a portable device can be the same as for the cameras described above, although viewfinder 22 (FIGS. 2 and 3) can also be eliminated.

In such a device, the media reader will preferably use a removable media using any suitable media, such as optical, magnetic or solid state memory media described above. Optionally, the media reader could be a storage device such as storage device 8, which also can store image signals on the storage media. Such image signals might be received from a remote source (such as over a telephone line, network interface, radio link, or other communications link). In this case then, the portable display device would be as illustrated in FIGS. 1 to 5, except lens 2 is deleted and sensor 4 is replaced by a suitable interface module (such as a modem, network interface or other communications hardware) with processor block 6 including any further necessary hardware and/or software. Such a display device may incorporate all other features of the camera describe above, and execute the methods described above for displaying stored images.

The invention has been described with reference to a preferred embodiment. However, it will be appreciated that variations and modifications can be effected by a person of ordinary skill in the art without departing from the scope of the invention.

PARTS LIST

2 Time Image
4 Sensor
6 Processor Block
8 Storage Device
12 User Interface
14 User Viewing Screen
20 Housing
22 Viewfinder
24 Reverse Button
26 Forward Button 28 Film Strip
28a Index Print
28b Bar
30 Gray Rectangles
30a Gray Rectangles
30b Light Gray Portion
34 Black Rectangles
34a Black Rectangles
34b Darker Gray Portion
35b Lower Resolution Version Of Image
36 Selected Location
36b Sliding Indicator
38 Displayed Image
38a Displayed Image
38b Lower Resolution Versions
42 Larger Resolution Version
50 Trailing Lines

What is claimed is:

1. A camera comprising:
    (a) means for capturing images of scenes as image signals;
    (b) storage means for storing the captured image signals;
    (c) a screen;
    (d) means for displaying on the screen a graphical representation of a list of the stored captured images, wherein the graphical representation does not include captured image data;
    (e) a user interface including an adjustable indicator arranged so that a user can select a particular graphical representation from the displayed graphical list corresponding to a desired captured image; and
    (f) means responsive to the selected particular graphical representation for causing the corresponding captured image signals to be applied to the screen for displaying on the screen the desired captured image, wherein the image displaying means requires a predetermined retrieval time to display an image, and wherein if during a retrieval time a user selects another graphical representation, the retrieval is terminated.

2. A camera according to claim 1 wherein the graphical displaying means additionally displays a graphical representation of space remaining within the storage means.

3. A camera according to claim 1 wherein the user interface allows a user to vary the position of the adjustable indicator on the screen so as to scroll through the graphical representation.

4. A camera according to claim 3 wherein the image displaying means allows scrolling without displaying images intermediate beginning and end scrolling positions on the graphical representation.

5. A camera according to claim 1 wherein the image displaying means only displays the captured image corresponding to the selected graphical representation provided a user does not select another graphical representation within a predetermined time.

6. A camera according to claim 1 wherein the image displaying means further includes means for initially displaying low resolution versions of the captured images which respectively correspond to the graphical representations on the list of stored images, and additionally causes a higher resolution version of the captured image corresponding to the selected graphical representation to be displayed on the screen provided a user does not select another graphical representation within a time required to display the low resolution version.

7. A camera according to claim 1 wherein the graphical representation of the list is a bar on the screen.

8. A camera according to claim 2 wherein the display means displays a graphic representation for both the list of stored images and space remaining as part of a single presentation which exhibits areas of different color or texture indicative of relative storage space occupied by the stored captured image signals and space remaining.

9. A camera comprising:
    (a) means for capturing images of scenes as image signals;
    (b) storage means for storing the captured image signals, the captured_image_signals being listed in the order in which the captured image signals were stored;
    (c) a screen;
    (d) means for displaying on the screen a graphical representation of the listed order of the stored captured images and moveable low resolution images corresponding to some of the captured images, wherein the graphical representation does not include captured image data;
    (e) a user interface including means for changing the displayed low resolution images from the listed order of captured images and an adjustable indicator arranged so that a user can select a particular graphical representation from the displayed graphical list corresponding to a desired captured image; and
    (f) means for causing a high resolution image from the corresponding captured image signals of the selected graphical representation to be applied to the screen for displaying on the screen the desired high resolution captured image, wherein the image displaying means requires a predetermined retrieval time to display an image, and wherein if during a retrieval time a user selects another graphical representation, the retrieval is terminated.

10. A camera according to claim 9 wherein the graphical displaying means additionally displays a graphical representation of space remaining within the storage means.

11. A camera according to claim 9 wherein the user interface allows a user to vary the position of the adjustable indicator on the screen so as to scroll through the graphical representation.

12. A camera according to claim 11 wherein the image displaying means allows scrolling without displaying images intermediate beginning and end scrolling positions on the graphical representation.

13. A camera according to claim 9 wherein the image displaying means only displays the high resolution captured image corresponding to the selected graphical representation provided a user does not select another graphical representation within a predetermined time.

14. A camera according to claim 9 wherein the image displaying means causes a higher resolution version of the selected image to be displayed only provided a user does not select another location within a time required to display the low resolution version.

15. A camera comprising:
    (a) means for capturing images of scenes as image signals;
    (b) storage means for storing the captured image signals, the captured_image_signals being listed in the order in which the captured image signals were stored;
    (c) a screen;
    (d) means for displaying on the screen a graphical representation of the listed order of the stored captured images and moveable low resolution images corresponding to some of the captured images, wherein the graphical representation does not include captured image data;

(e) a user interface including means for changing the displayed low resolution images from the listed order of captured images and an adjustable indicator arranged so that a user can select a particular graphical representation from the displayed graphical list corresponding to a desired captured image, wherein the adjustable indicator is movable at varying rates, and wherein the display means causes an additional visual indication to be displayed on the screen when the faster rate is selected; and (f) means for causing a high resolution image from the corresponding captured image signals of the selected graphical representation to be applied to the screen for displaying on the screen the desired high resolution captured image.

16. A camera according to claim 15 wherein the graphical displaying means additionally displays a graphical representation of space remaining within the storage means.

17. A camera according to claim 15 wherein the user interface allows a user to vary the position of the adjustable indicator on the screen so as to scroll through the graphical representation.

18. A camera according to claim 17 wherein the image displaying means allows scrolling without displaying images intermediate beginning and end scrolling positions on the graphical representation.

19. A camera according to claim 15 wherein the image displaying means requires a predetermined retrieval time to display an image, and wherein if during a retrieval time a user selects another graphical representation, the retrieval is terminated.

20. A camera according to claim 15 wherein the image displaying means only displays the high resolution captured image corresponding to the selected graphical representation provided a user does not select another graphical representation within a predetermined time.

21. A camera according to claim 15 wherein the image displaying means causes a higher resolution version of the selected image to be displayed only provided a user does not select another location within a time required to display the low resolution version.

* * * * *